Aug. 12, 1952     J. F. ZISKAL     2,606,532
STOP MECHANISM FOR IMPLEMENT ADJUSTING CYLINDERS
Filed Feb. 19, 1952     4 Sheets-Sheet 1
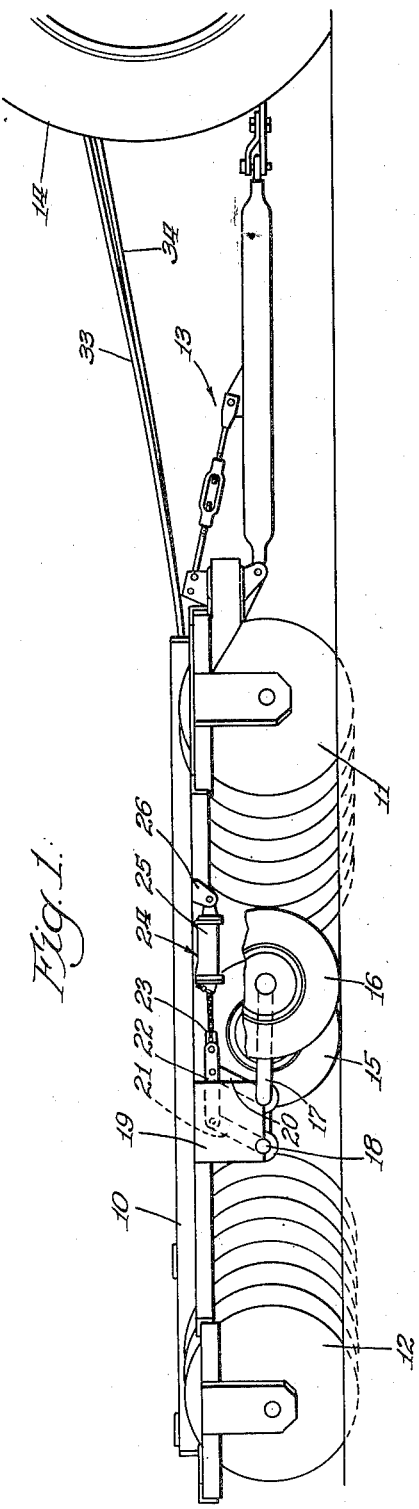
INVENTOR.
Joseph F. Ziskal
BY Paul O. Pippel
Atty.

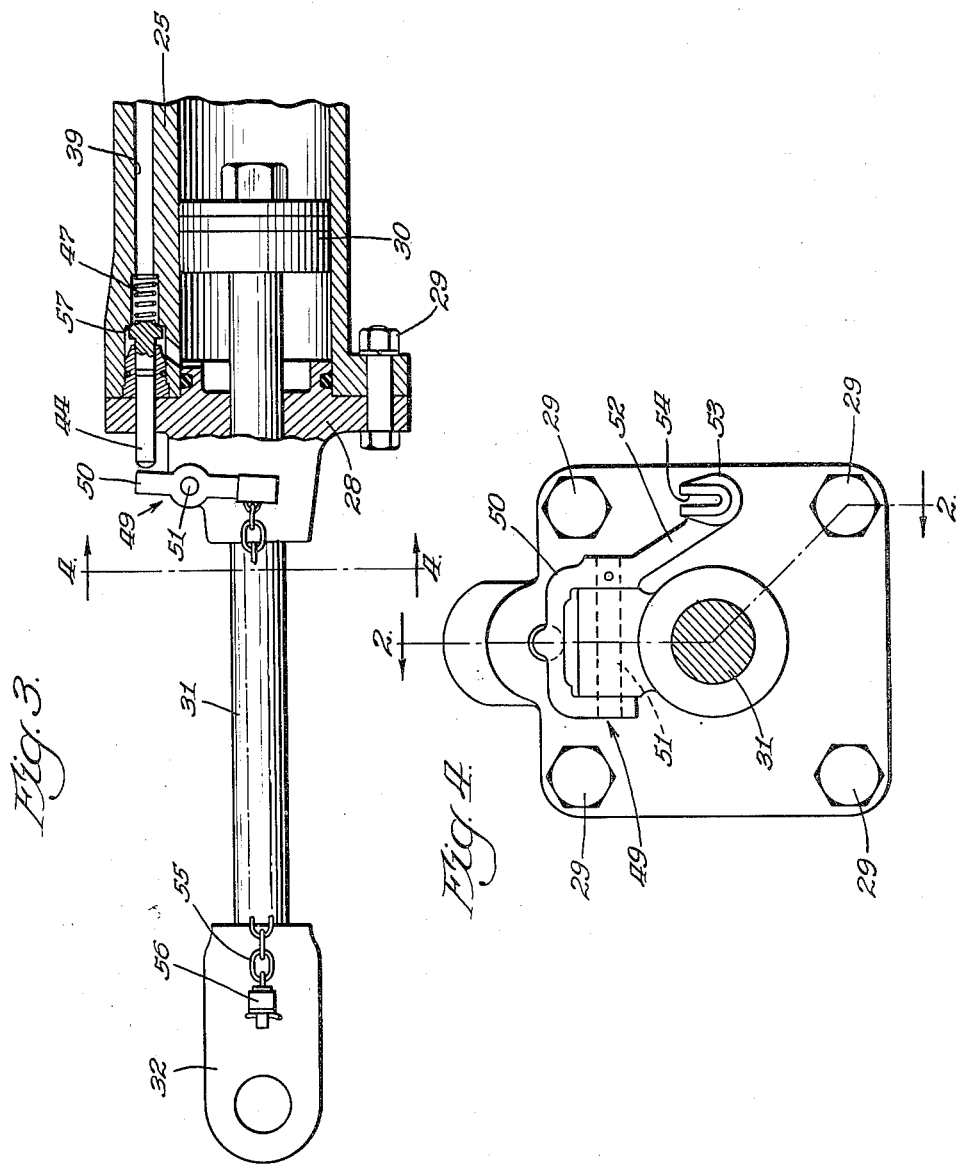

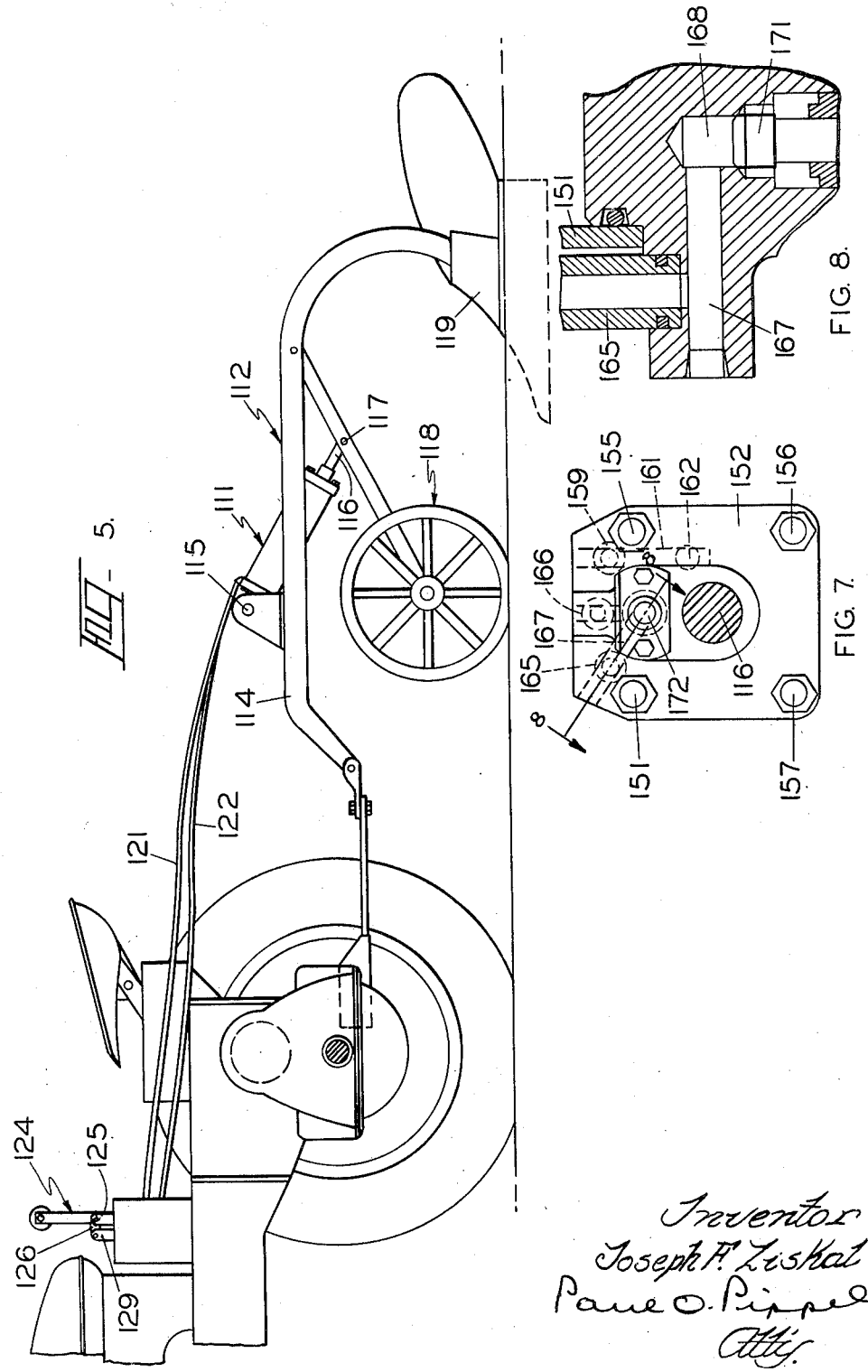

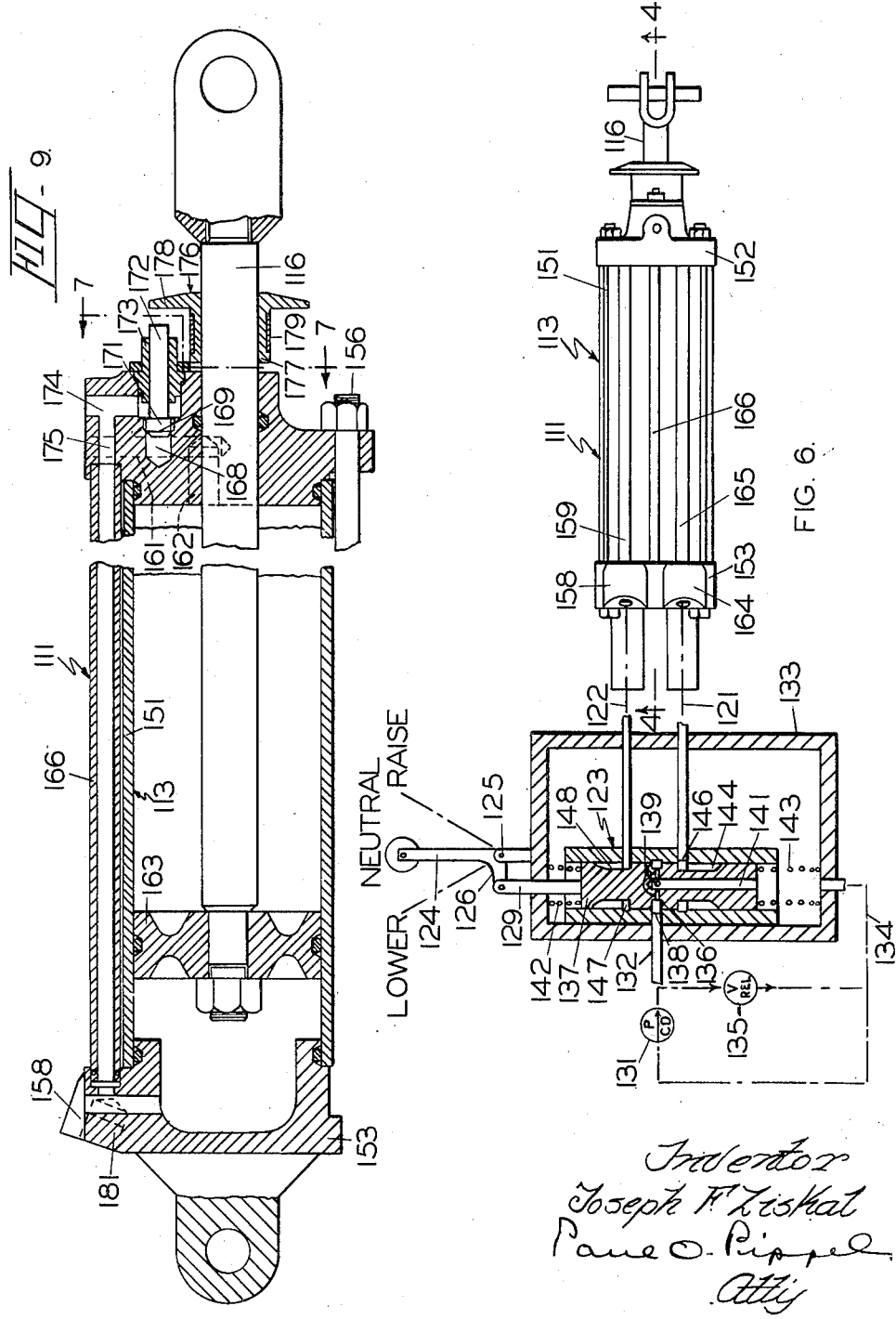

Patented Aug. 12, 1952

2,606,532

UNITED STATES PATENT OFFICE 2,606,532

STOP MECHANISM FOR IMPLEMENT ADJUSTING CYLINDERS

Joseph F. Ziskal, Brookfield, Ill.

Application February 19, 1952, Serial No. 272,335

10 Claims. (Cl. 121—38)

1

This invention relates to agricultural implements and particularly to depth control mechanism therefor. More specifically the invention concerns a hydraulic ram unit adapted for use upon a trail-behind implement and having incorporated therein adjustable means for limiting the stroke of the piston. This application is a continuation-in-part of U. S. application Serial No. 760,623, filed July 12, 1947, and of Serial No. 98,222 filed June 10, 1949, both now abandoned.

In trail-behind agricultural implements wherein the operating depth is regulated and the implement raised and lowered by a hydraulic ram unit or the like receiving fluid under pressure from a power source deriving energy from the tractor by which the implement is drawn, considerable difficulty has been experienced in returning the implement to a selected operating position after it has been raised to transport as in turning at the end of a field or the like. Therefore the present invention has for its object the provision of a simple and effective stop mechanism limiting the stroke of the piston of the hydraulic ram.

Another object of the invention is the provision of a hydraulically operated stop associated with a ram unit for limiting the throw of the piston, and means for adjusting the stop mechanism to vary the throw of the piston and consequently the operating position of the implement with which the ram unit is associated.

A further object of the invention is to provide in a ram unit associated with an agricultural implement and receiving fluid under pressure from a power source carried upon the tractor by which the implement is drawn, stop mechanism associated with the ram unit and automatically operable to limit the throw of the piston.

No attempt has been made herein to claim broadly a stop mechanism for limiting the stroke of the piston of a hydraulic ram.

Other objects and advantages of the invention will become clear from the following detailed description when read in conjunction with the accompanying drawings, wherein:

Figure 1 is a view in side elevation of an implement in the form of a disk harrow connected to a tractor in trail-behind relationship thereto and having mounted thereupon one form of hydraulic ram unit embodying the features of the present invention.

Figure 2 is a view partly in section showing a hydraulic cylinder and piston embodying the stop mechanism of the present invention and showing the piston in retracted position within the cylinder.

2

Figure 3 is a sectional view of a portion of the cylinder and piston structure shown in Figure 2 with the piston rod extended;

Figure 4 is a view of one of the heads of the cylinder of Figure 2 showing a portion of the stop mechanism.

Figure 5 is a view in side elevation of another implement in the form of a moldboard plow connected to a tractor in trail-behind relationship and having mounted thereupon an optional form of hydraulic ram unit embodying the features of this invention.

Figure 6 is a view, partly diagrammatic, illustrating the control value of the hydraulic lift apparatus of Figure 5 and the connections between this valve and the hydraulic ram.

Figure 7 is a transverse sectional view taken on the line 7—7 of Figure 9.

Figure 8 is a fragmentary view taken on the line 8—8 of Figure 7 and

Figure 9 is a longitudinal sectional view taken through the axis of the ram in Figure 6, as indicated by the line 9—9.

Referring to Figures 1 to 4 of the drawings, it will be noted that the disk harrow shown in Figure 1 comprises a supporting frame 10 having front and rear disk gang sections 11 and 12, respectively, carried thereupon. The implement is connected by a hitch structure 13 to a tractor 14. The implement is vertically moved between operating and transport positions, and its depth of operation is gauged by supporting wheels 15 and 16 mounted upon crank axles 17 and 18 carried in one or more brackets 19 suspended from the frame 110. The harrow shown in Figure 1 is for illustrative purposes to indicate the manner in which the hydraulic ram unit of the present invention is utilized to raise and lower and to adjust the depth of the earth-working tools.

The crank axles 17 and 18 have secured thereto vertically extending arms 20 and 21 which are connected by a link 22 serving for the pivotal attachment of the piston 23 of a hydraulic ram unit generally indicated at 24 and including a cylinder 25 pivotally connected to a lug 26 affixed to the frame 10 of the harrow. It will be noted in Figure 1 that extension of the piston 23 will rock the arms 20 and 21 and the cranks 17 and 18 in an anti-clockwise direction to raise the wheels 15 and 16 with respect to the harrow frame and lower the disk gang sections 11 and 12 to operating position. Retraction of the piston 23 within the cylinder 25 swings the wheels 15 and 16 downwardly and raises the gang sections to transport position or raises the tools to a shallower working depth.

Mechanism is incorporated with the ram unit 24 to limit the upward swinging of the wheels 15 and 16 with respect to the harrow frame so that when reversing direction at the end of a field or the like the implement may be returned to the same operating position after it has been raised to transport.

Ram unit 24 includes the cylinder 25 provided at its ends with heads 27 and 28, each of which is secured to the cylinder by one or more bolts 29. Slidably received in the cylinder 25 is a piston 30 having a rod 31 extending outwardly through an opening in the forward head 28 and provided at its end with an attaching clevis 32 by which the piston is pivotally connected to the link 22. Fluid under pressure is supplied to the cylinder from a power source, not shown, carried by the tractor 14 and deriving power therefrom. The ram unit of the present invention is a double-acting type and fluid is supplied thereto and withdrawn therefrom through hoses 33 and 34 leading from the cylinder to the tractor power source. The flow of fluid to and from the cylinder 25 is suitably controlled by the tractor operator by mechanism, not shown, preferably including means for cutting off the flow of fluid and forming a closed circuit in the cylinder.

Hose 34 is connected to the cylinder 25 by way of a threaded opening 35, and fluid under pressure is passed therethrough and enters the cylinder by a port 36 to move piston 30 to the left as viewed in Figure 2 and extend the piston rod 31. As previously pointed out, this extension of the piston rod raises the wheels 15 and 16 with respect to the frame and lowers the gang sections 11 and 12 into the ground. Connection of hose 33 to the cylinder is made at a threaded opening 37 formed in an enlargement 38 on the cylinder wall. Enlargement 38 extends the length of the cylinder and is provided with a bore 39 communicating with the opening 37 and opening into the end of the cylinder adjacent the head 28 through a port 40. In order to move the piston 30 to the right in Figure 2 and retract the piston rod 31, fluid is passed under pressure through hose 33 and bore 39 to the port 40. Fluid directed through one of the hoses 33 or 34 under pressure from the tractor power source is returned through the other hose to the oil reservoir carried by the tractor.

The enlargement 38 of the cylinder 25 is provided at the end adjacent cylinder head 28 and port 40 with a valve mechanism designated by the numeral 41 and including a valve seat 42 carried in an enlargement 43 of the bore 39 and a valve stem 44 slidable therein. Valve stem 44 extends through an opening 45 in the cylinder head 28 and is provided with an enlargement 46 engaged by a spring 47 which abuts a shoulder 48 constituting an enlargement of the bore 39.

In the position of the valve stem 44 as shown in Figure 2, the valve is open to the passage of fluid in either direction through the port 40 into or out of the opening 37. The valve is held in this open position by the spring 47. Upon movement of the valve stem 44 to the right in Figure 2 against the action of the spring 47 as indicated in Figure 3, the flow of fluid to or from the port 40 is cut off. Movement of the valve 41 to closed position is accomplished by mechanism including a member in the form of a bell-crank 49 having a yoke portion 50 mounted upon a pivot pin 51 carried by the cylinder head 28. Yoke portion 50 of the bell-crank 49 constitutes an arm thereof engageable with the projecting end of the valve stem 44.

In the position of the piston rod 31 shown in Figure 2, the disk harrow with which the ram unit is associated is in its transport position. Upon lowering the implement to its operating position it is desirable that a predetermined fixed stop should be provided so that the implement will always return to the same operating position when raised out of the ground as in turning at the end of a field or the like. It is likewise desirable that this lowered position of the working tools be adjustable so that the working depth of the tools may be varied. Another arm 52 of the bell-crank 49 is provided with an enlarged end portion 53 having a slot 54 therein. Slot 54 is adapted to receive one link of a chain 55, one end of which is anchored to a bracket 56 affixed to the head 32 of the piston rod 31.

When it is desired to lower the implement to its operating position, fluid under pressure is passed through hose 34 and opening 35 in the cylinder head 27 through port 36 to force the piston 30 to the left as viewed in Figure 2. As the piston rod 31 moves outwardly the slack is taken up in chain 55 and the bell-crank 49 is rocked in a clockwise direction as indicated in Figure 3 until arm 50 thereof engages the projecting portion of the valve stem 44. Valve stem 44 is moved to the right until the head 46 engages a shoulder 57 in the enlarged opening 43 of the bore 39. The flow of fluid outwardly through the port 40 is thus cut off and the movement of the piston 30 is stopped so that the tool gang sections 11 and 12 cannot go beyond the selected depth of operation thereof as determined by the operative length of the chain 55. Suitable relief valve mechanism is provided, of course, preferably at the tractor pressure source. The adjustment of the operating depth of the tool is accomplished simply by removing the chain link from the slot 54 in the arm 52 of the rockable member or bell-crank 49 and inserting another link of the chain therein. It may be understood that as the piston 30 approaches the position shown in Figure 3 and the rockable member 49 is urging the movable valve stem 44 into its closed position, the pressure of the oil entering port 40 and reacting against the head 46 becomes sufficient to snap the valve stem 44 into its closed position against the shoulder 57 of the valve opening and to stop the movement of the piston 30. This sudden closing of the valve 41 causes the projecting end of the valve stem 40 to move slightly away from the arm 50 of the bell-crank 49. Thus it may be understood that in the position of the parts shown in Figure 3 the end of the valve stem 44 is slightly spaced from the arm 50 of the bell-crank due to the fact that the piston rod 31 has been stopped prior to the chain 55 becoming completely taut. Therefore when the piston 30 is to be retracted and the implements raised to transport position the fluid circuit is again opened and fluid under pressure directed through hose 33, opening 37 and bore 39 to the port 40. The release of fluid through port 36, and the entrance thereof into the bore 39 causes the valve stem 40 to move outwardly until it engages the arm 50 of the bell-crank, and the flow of fluid into the cylinder and against the piston 30 causes the latter to retract and to lift the implements into their inoperative position.

A spring may, if desired, be substituted for one of the links of chain 55. This is desirable to allow a certain amount of overtravel of the piston where the tractor operator has failed to free the system of air.

Referring now to Figures 5 to 9 the modified hydraulic lift apparatus shown in these drawings will be seen to include a hydraulic ram 111 mounted upon a trail-behind implement in the form of a moldboard plow 112. One end of the ram cylinder 113 is pivotally connected with the implement frame 114 by a pin 115 whereas the piston rod 116 of the ram is pivotally connected by a pin 117 with a depth gauge assembly 118 for raising the implement tool 119 to the transport position when the ram 111 is expanded. Such expansion of the ram occurs when fluid is introduced thereinto through a conduit 121 and simultaneously exhausted therefrom through a conduit 122. These conduits 121 and 122 are flexible hoses which lead from the casing of a tractor-mounted valve 123. Valve 123 is manually controlled by a bell-crank 124 pivotally mounted at 125 and having a horizontal arm 126 connected with the upper end of a valve stem 129 of the valve 123.

Referring now to Figure 6, the valve 123 receives fluid from a constant delivery pump 131 through a conduit 132. The pump is mounted upon and driven by the tractor power plant. Fluid is supplied to the pump from a reservoir 133 through a conduit 134. A pressure release valve 135 is connected between the conduits 132 and 134 to allow the pump to circulate therethrough should a predeterminedly high pressure condition prevail in the conduit 132.

Valve 123 is shown in a neutral low-pressure bypass condition wherein a circumferential groove 136 of a plunger 137 is in registry with a circumferential valve casing groove with which the conduit 132 communicates. Fluid entering the grooves 138 and 136 flows therefrom through radial passages 139 into an axial exhaust channel 141 in the plunger 137 from which it discharges directly into the reservoir 133. Springs 142 and 143 bias the valve plunger 137 toward this neutral position.

If the valve plunger 137 is raised for causing a lower circumferential groove 144 thereof to simultaneously register with valve-casing grooves 138 and 146, fluid from the pump will flow through the groove 144 into the groove 146 and thence to the ram 111 through the hose 121. Simultaneously fluid discharged from the ram will flow through the hose 122 into the circumferential casing groove 147 with which the plunger groove 136 then registers. Consequently the fluid returned to the valve through the hose 122 will be delivered through the valve passage 141 into the reservoir.

Movement of the valve plunger 137 downwardly from the neutral position for bringing the circumferential plunger groove 148 into bridging relation with the casing grooves 138 and 147 will cause fluid delivered from the pump to be delivered to the ram through the hose 122 and to be discharged from the ram through the hose 121. This fluid returned through hose 121 is delivered into the casing channel 146 and thence into the plunger channel 136 from which the fluid flows radially inwardly through the passages 139 and thence through the plunger passage 141 into the reservoir.

Thus, while the valve plunger 137 is in the neutral position shown, the pump can deliver fluid through the valve into the reservoir at low pressure and while the valve plunger occupies an upward setting, fluid is delivered to the ram through the hose 121 and returned to the reservoir through the hose 122 and when the valve plunger is moved to a downward setting fluid is delivered to the ram through the hose 122 and discharged therefrom through the hose 121.

Referring now to Figures 6, 7, and 9, the ram cylinder 113 can be seen to be formed of a tubular member 151 having end wall castings 152 and 153 secured thereto by four tie bolts 154—157. End wall casting 153 has a hose-connecting structure 158 with which the hose 122 is communicatively connected. This structure 158 also communicates with a tube 159 and the right end of this tube extends into the connecting-rod end wall 152 where communication is had with the interior of the cylinder through an L-shaped passage 161—162 having a vertical portion 161 and an axial portion 162. The passage 161—162 communicates with that portion of the ram cylinder between the ram piston 163 and the piston rod end 152 of the ram.

Hose 121 is communicatively attached to hose attaching structure 164 on the left end of the cylinder. A pair of tubes 165 and 166 are serially included in passage means providing communication between the hose-connecting structure 164 and that portion of the ram cylinder between the piston 163 and the left end or wall 153 of said cylinder. The piston rod end wall 152 contains a diagonal passage 167 communicating between the right end of the tube 165 and the left end of a passage portion (recess) 168, Figure 9 drilled axially into the cylinder end wall 152. This passage portion (recess) 168 comprises a section of a fluid conducting passage 165—167—168—166—174—175. A valve seat 169 circumscribes a section of the passage portion 168 and this valve seat complements a valve element 171 in forming a stop valve. Said valve element 171 is in the form of a head upon a valve stem 172 which serves as a valve operating element for the valve 169—171. Valve stem 172 is reciprocally mounted in a bearing sleeve 173 mounted in the end wall 152. An L-shaped passage section 174—175 communicates between the tube 166 and a part of the passage portion 168 to the right of the valve seat 169 as viewed in Figure 9.

A valve-closing element 176 for the valve 169—171 is mounted upon the piston rod 116. This valve-closing element comprises an axially split hub 177 and a circular flange 178 of sufficiently great radius for abutting with the valve-operating element 172. Although the element 176 is slidable for manual adjustment lengthwise of the piston rod, said element engages the piston rod with sufficient force to offer substantial resistance to said adjustment wherefor the frictional engagement between said element and the piston rod will cause the element to remain set while exerting an endwise force upon the element 172 for closing the valve 169—171. The desired frictional gripping of the split hub 177 on to the piston rod is obtained by a gripping band 179 circumscribing said hub.

Assuming first the parts to be in the positions illustrated in Figure 6, liquid from the pump 131 will flow through the conduit 132 into the annular groove 136 of the valve plunger 127, thence through radial passages 139 and the exhaust passage 141 into the reservoir 133. The pump withdraws liquid from the reservoir through the conduit 134, causing constant circulation of the fluid at low pressure. If the operator desires to raise the implement tool to transport position, he will manipulate the lever 124 for raising the valve plunger 137 to place the circumferential groove 144 of the plunger in communicative relation between the valve casing annular passages 138 and 146. This upward movement of the plunger will also place the plunger annular groove 136 in registry with the casing annular groove 147. Upon this setting of the valve, fluid from the pump will flow through the conduit 132 into the annular groove 138, thence into the groove 144, groove 146, hose 121, ram cylinder tube 165, diagonal passage 167 in the piston rod end wall of the ram cylinder, fluid passage section 168, past the valve seat 169 (incident to unseating the valve element 171 in a downstream direction), L-shaped passage 174–175, tube 166 and passage 181 into that portion of the cylinder between the piston 163 and the non-piston rod end wall 153. Fluid thus entering the ram cylinder will force the piston to the right and will be operable through the gauge assembly 118 for raising the tool 119. Meanwhile, fluid will be exhausted from that part of the ram cylinder between the piston and the piston rod end wall 152 thereof. This exhaust of fluid takes place through the L-shaped passage 162–161, tube 159, hose 122, annular groove 136 of the valve plunger, the radial passages 139 in the plunger and the exhaust passage 141 into the reservoir. When the tool has been elevated the desired distance the operator will release the hand control lever 124 and allow the springs 142–143 to re-establish the neutral setting of the valve.

When it is later desired to cause advancement of the tool from the transport position to a position of desired working elevation or depth below the surface of the soil, the operator will manipulate the control lever 124 to lower the valve plunger 137 from the neutral to place the circumferential groove 148 in communicative relation between the casing grooves 138 and 147. This allows the pump to discharge into the hose 122 and places the plunger groove 136 in registry with the casing groove 146 so the hose 121 is connected with the valve exhaust passage 141. Fluid under pressure from the pump entering the hose 122 flows through the ram tube 159 and thence through the L-shaped passage 161—162, Figures 7 and 9, into the piston rod end of the ram cylinder. This causes telescopic contraction of the ram attendant to the tool 119 being lowered. Concurrently, fluid will be exhausted from the non-piston rod end of the ram through the passage 181, tube 166, L-shaped passage 175—174, through the valve 169—171 in the passage portion 168, passage 167 (Figure 7), tube 165, hose 121 and the exhaust passage 141 of the control valve into the reservoir 133. As the ram piston moves to the left the valve-closing element 176 constrained for movement therewith will eventually contact and press the valve-operating element 172 inwardly to place the valve head element 171 in throttling relation with respect to the fluid being exhausted through the passage portion 168. This creates a pressure differential in the fluid discharged through the passage portion 168, the pressure of fluid becoming greater on the upstream side of the valve seat 169 than in the downstream side thereof, wherefor a greated pressure occurs on the right end of the head 171 than on the left end thereof. Therefore, after the valve-closing element 176 has pressed the valve-operating element 172 into said throttling valve-closing-initiating position, the valve element 171 will be closed by the action of fluid pressure. As the valve closes, the stem or valve-operating element 172 will depart to the left from the valve-closing element 176 leaving a space between these two elements 172 and 176 when the valve 169—171 becomes closed and stops further telescopic contraction of the ram. This stopping of the ram operation also stops advancement of the tool 119 wherefor the tool can be predeterminedly positioned correlatively with selective settings of the valve-closing element 176 lengthwise of the piston rod 116.

It is ascertainable from the drawings that further movement of the ram piston 163 after the tool 119 is advanced to the desired working position is precluded by the trapping of fluid under compression between the piston 163 and the non-piston rod end wall 153 of the ram cylinder. Inasmuch as the liquid in the hydraulic circuit is essentially non-compressible at the pressures attained in a hydraulic system of this character, the tool will not descend beyond the desired position. This would not be the case, however, if the valve 169—171 were placed in a passage through which fluid is introduced into the ram instead of in the passage through which fluid is exhausted therefrom during descent or advance of the tool to the desired working position. Under those circumstances gravitational force of the tool applied to the piston would incur cavitation in that portion of the hydraulic portion between the valve and the piston, allowing variable overtravel of the tool, depending upon the weight thereof or the "suction" of the soil upon a soil-working tool.

Inasmuch as the valve-operating element 172 departs from the valve-closing element 176 pursuant to closing of the valve attendant to the tool reaching the advanced lowered working position, subsequent opening of the valve and movement of the element 172 to the right toward the element 176, pursuant to the initial lifting of the tool to transport position will not first involve abutting of the element 172 against the element 176 which will change the setting of the latter upon the piston rod. As fluid is introduced into the left end of the ram cylinder for moving the piston 163 to the right to lift the tool from the working position, the fluid thereby exhausted from the right end of the ram cylinder through the passage portion 168 will, of course, unseat the valve element 171, but this occurs while the piston and piston rod together with the element 176 are moving to the right so that by the time the valve 169—171 is fully open, the valve-closing element 176 will be out of the position where it could be abutted by the valve stem 172.

Attaching the hoses 121 and 122 to the same end of the ram cylinder facilitates the ease with which the ram may be manipulated for attaching and detaching between an implement frame and a part thereon to be controlled by the ram. This type of hose connection also makes it less difficult to cause the hoses to assume a contiguous relation throughout their length since the hoses are of the same length and their ends are juxtaposed both at the tractor and at the ram.

Use of the two tubes 165 and 166 in serial relation in forming the passage between the hose-connecting structure 164 and the interior portion of the ram cylinder between the non-piston rod end and the piston makes it possible to connect both hoses to the non-piston rod end wall of the cylinder and to also provide the passage portion 168 extending axially of the ram cylinder at a position where the valve 169—171 disposed in such passage portion is accessible for operation by a valve-closing element 176 mounted upon the piston rod.

It is believed that the operation of the devices of the present invention will be clearly understood from the foregoing description. However, it should be further understood that modifications may be made in the invention without departing from the spirit thereof or the source of the appended claims.

What is claimed is:

1. A hydraulic ram comprising a cylinder, a piston slidable in the cylinder, a piston rod carried by the piston and projecting from the end of the cylinder, ports formed in the cylinder at opposite sides of the piston for the admission of fluid to and the discharge of fluid from the cylinder to move the piston, a conduit for leading the fluid from the cylinder, a valve providing communication between the discharge port and the conduit for interrupting the discharge of fluid from the cylinder including a plunger having an enlarged head movable past said discharge port in its passage between open and closed positions with respect to said conduit, a member carried by the ram approachable toward and engageable with said plunger and actuated in response to operation of the ram to move the plunger past said discharge port to its closed position, the pressure and direction of flow of the fluid from the discharge port against the enlarged head of the plunger being such as to urge the plunger to its closed position after a predetermined movement thereof irrespective of the position of the member with respect to the plunger.

2. A hydraulic ram comprising a cylinder, a piston slidable in the cylinder, a piston rod carried by the piston and projecting from the end of the cylinder, ports formed in the cylinder at opposite sides of the piston for the admission of fluid to and the discharge of fluid from the cylinder to move the piston, a conduit for leading the fluid from the cylinder, a valve providing communication between the discharge port and the conduit for interrupting the discharge of fluid from the cylinder including a plunger having an enlarged head movable past said discharge port in its passage between open and closed positions with respect to said conduit, a member carried by the ram approachable toward and engageable with said plunger and actuated in response to operation of the ram to move the plunger past said discharge port to its closed position, the pressure and direction of flow of the fluid from the discharge port against the enlarged head of the plunger being such, after a predetermined movement of the plunger, as to react against the plunger head and snap it into closed position ahead of the movement of the member.

3. A hydraulic ram comprising a cylinder, a piston slidable in the cylinder, a piston rod carried by the piston and projecting from the end of the cylinder, ports formed in the cylinder at opposite sides of the piston for the admission of fluid to and the discharge of fluid from the cylinder to move the piston, a valve asociated with one said port for interrupting the flow of fluid therethrough including a plunger, means for closing the valve in response to movement of the piston in the cylinder comprising a member approachable toward and engageable with the plunger in the first part of its stroke and actuated by the movement of the ram piston to move the plunger toward its closed position, and means associated with the plunger and reacting against the fluid pressure in the cylinder in the last part of the plunger stroke to move the plunger ahead of the member and independently thereof to close the valve.

4. A hydraulic ram comprising a cylinder, a piston slidable in the cylinder, a piston rod carried by the piston and projecting from the end of the cylinder, ports formed in the cylinder at opposite sides of the piston for the admission of fluid to and the discharge of fluid from the cylinder to move the piston, a valve associated with one said port for interrupting the flow of fluid therethrough including a plunger, means for closing the valve in response to movement of the piston in the cylinder comprising a member approachable toward and engageable with the plunger in the first part of its stroke and actuated by the movement of the ram piston to move the plunger toward its closed position, said plunger having an enlarged head forming an abutment reacting against the fluid pressure in the cylinder in the last part of the plunger stroke to move the plunger ahead of the member independently thereof to close the valve.

5. A hydraulic ram comprising a cylinder, a piston slidable in the cylinder, a piston rod carried by the piston and projecting from the end of the cylinder, ports formed in the cylinder at opposite sides of the piston for the admission of fluid to and the discharge of fluid from the cylinder to move the piston, a valve associated with one said port for interrupting the flow of fluid therethrough including a plunger, means for closing the valve in response to movement of the piston in the cylinder comprising a rockable member carried by the cylinder engageable with one end of said plunger, said plunger being movable through a part of its closing stroke by movement of the rockable member, a flexible connection between the piston rod and said member to rock the latter after the piston has moved a predetermined distance and move the plunger toward its closed position, said plunger having an enlarged portion reactable against the fluid pressure in the cylinder during the last part of the stroke of said plunger to move the plunger ahead of the rockable member and independently thereof to close the valve.

6. In a hydraulic power adjuster, a cylinder, a piston reciprocable in said cylinder, a piston rod connected with the piston and extending through an end of the cylinder, a fluid conducting passage communicating interiorly of the cylinder between the opposite end thereof and the piston, a check valve disposed in said passage, said check valve being openable by the pressure of fluid entering the passage en route to the cylinder and being adapted to remain open until adjusted into a closing initiating position wherein the valve is receivable of force from fluid expelled from the cylinder through said passage to effect closing of such valve, said valve having a stem projecting exteriorly of the cylinder, and a valve-closing initiating element mounted on and adjustable lengthwise of said piston rod for applying force to the valve stem to adjust the valve into the closing initiating position attendant to movement of the piston in the direction for expelling the fluid from the cylinder through said passage.

7. In a hydraulic ram and control therefor, a cylinder, a piston reciprocally in the cylinder, a piston rod projecting from the piston through one end of the cylinder, a fluid conducting passage communicating with the interior of the cylinder between the opposite end thereof and the piston, said passage including a section in the piston rod end of the cylinder and directed axially thereof, a valve in said passage and comprising a valve seat circumscribing said passage section, said valve seat facing axially outwardly with respect to said one end of the cylinder and also facing in a downstream direction with respect to fluid flowing toward said interior of the cylinder, a valve-operating element arranged coaxially with said seat and projectable endwise outwardly through said piston rod end of the cylinder, said valve-operating element being movable endwise toward the seat to place the valve in a throttling condition creating a pressure differential across the valve seat in fluid exhausting from said cylinder interior through said channel section, the valve being operable to close responsively to such pressure differential, and a valve-closing element mounted on the piston rod for movement therewith into abutting relation with the valve-operating element to move the same for establishing the throttling condition of the valve to initiate closing thereof.

8. In a hydraulic ram and control therefor, a cylinder, a piston reciprocally in the cylinder, a piston rod projecting from the piston through one end of the cylinder, a fluid conducting passage communicating with the interior of the cylinder between the opposite end thereof and the piston, said passage including a section in the piston rod end of the cylinder and directed axially thereof, a valve in said passage and comprising a valve seat circumscribing said passage section and a headed valve stem of which the head is alternatively movable onto and from said seat, said valve seat facing axially outwardly with respect to said one end of the cylinder and also facing in the downstream direction with respect to fluid flowing through the passage to the interior of the cylinder, said valve stem being arranged coaxially with said seat and projectable endwise outwardly through the piston rod end of the cylinder, said valve stem being movable endwise toward the seat to place the valve in a throttling condition creating a pressure differential across the valve seat in fluid exhausting from the cylinder interior through said passage, the headed stem being operable responsively to such pressure differential to incur further movement of the stem pursuant to closing the valve, and a valve-closing element mounted on the piston rod for movement therewith into abutting relation with the valve stem to move the same for establishing said pressure differential to initiate closing of the valve pursuant to said further movement of the valve stem, and said further movement of the valve stem causing it to depart from the valve-closing element and thereby leaving a space between said stem and said element when the piston is brought to rest by the closing of the valve.

9. In a hydraulic ram and control therefor, a cylinder, a piston reciprocally in the cylinder, a piston rod projecting from the piston through a piston-rod end of the cylinder, a pair of hose-connecting structures upon the other end of the cylinder, channel means extending lengthwise of the cylinder and communicating between one of said hose-connecting structures and the space between the piston-rod end of the cylinder and the piston, a second channel means including a component communicating with the other of said hose connecting structures and extending therefrom lengthwise of the cylinder into the piston-rod end of the cylinder, said second channel means comprising a second component extending from the piston-rod end of the cylinder back to the other end thereof where this second component communicates with the interior of the cylinder between such other end and the piston, a valve disposed in said second channel means within a section thereof disposed in the piston-rod end of the cylinder, said valve including a valve seat circumscribing said channel section and facing in a down-stream direction with respect to fluid flowing through the channel means toward the interior of the cylinder, and said channel section and valve seat being oriented so the valve seat faces axially outwardly of the piston-rod end of the cylinder, a valve-operating element arranged coaxially with said seat and projectable endwise outwardly through said piston-rod end of the cylinder, said valve-operating element being movable endwise toward the seat to place the valve in a throttling condition creating a pressure differential across the valve seat in fluid exhausting from said cylinder interior through said channel section, the valve being operable for closing responsively to such pressure differential, and a valve-closing element mounted on the piston rod for movement therewith into abutting relation with the valve-operating element to move the same for establishing the throttling condition of the valve to initiate closing thereof.

10. In a hydraulic power adjuster, a cylinder, a piston reciprocatable in said cylinder, a piston rod connected with the piston and extending through an end of the cylinder, a fluid conducting passage communicating interiorly of the cylinder between the opposite end thereof and the piston, said passage having a section disposed in said piston rod end of the cylinder and directed axially thereof, a valve comprising a seat circumscribing said passage section and facing endwise outwardly of said cylinder end, said valve also comprising a headed valve stem arranged coaxially with said seat, a valve-stem-receiving bearing in said end of the cylinder, said valve stem being mounted in said bearing and for non-biased endwise movement therein between a valve-closed position wherein the valve stem head is upon the valve seat and a valve-open position wherein the head is axially displaced from said seat, said valve stem having an intermediate throtting position wherein its head is operable to create a pressure differential thereacross in fluid exhausting from the cylinder through said passage, the headed stem being operable responsively to such pressure differential to incur endwise movement into the valve-closed position, the headed stem being oppositely endwise movable to the valve-open position responsively to a reversal of fluid flow through said passage and to remain in such valve-open position during the exhaust of fluid through the passage section unless moved toward the seat into said intermediate throttling position, and a valve-closing element mounted on and adjustable lengthwise of said piston rod for imparting force to the valve stem to move it into said intermediate throttling position attendant to movement of the piston in the direction for exhausting fluid from the cylinder through said passage.

JOSEPH F. ZISKAL.

No references cited.